Figure 5:
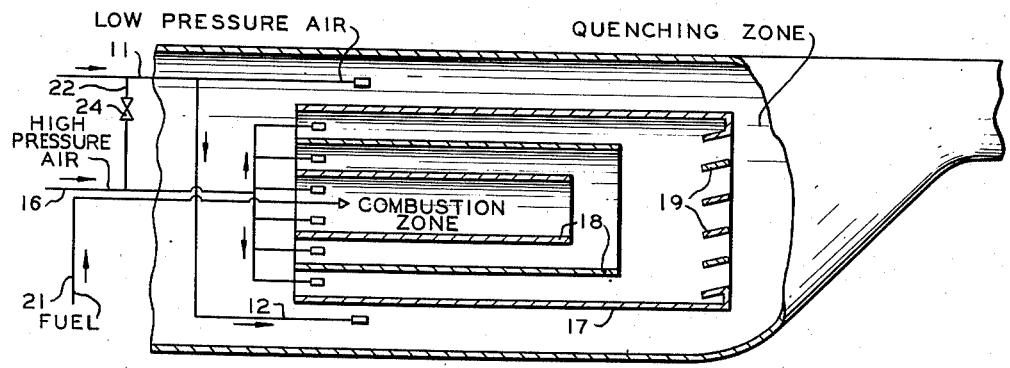

Nov. 12, 1957  H. M. FOX  2,812,637
FUEL AIR RATIO REGULATION FOR COMBUSTION SYSTEMS
Filed Dec. 21, 1951  2 Sheets-Sheet 1

INVENTOR.
H. M. FOX
BY
Hudson & Young
ATTORNEYS

Nov. 12, 1957 H. M. FOX 2,812,637
FUEL AIR RATIO REGULATION FOR COMBUSTION SYSTEMS
Filed Dec. 21, 1951 2 Sheets-Sheet 2

INVENTOR.
H.M. FOX

ATTORNEYS

United States Patent Office 2,812,637
Patented Nov. 12, 1957

2,812,637

FUEL AIR RATIO REGULATION FOR COMBUSTION SYSTEMS

Homer M. Fox, Bartlesville, Okla., assignor to Phillips Petroleum Company, a corporation of Delaware Application December 21, 1951, Serial No. 262,870

8 Claims. (Cl. 60—39.03)

This invention relates to continuous combustion devices such as gas turbines. In one of its aspects this invention relates to turbojet engines. In another of its aspects this invention relates to gas turbine combustion chambers. In still another of its aspects this invention relates to a method and apparatus for maintaining high combustion efficiency in a gas turbine over a wide range of operating conditions.

The function of the combustion chamber in engines of the gas turbine type is the same in either a gas turbine power plant or a turbojet engine. It is that component wherein fuel is introduced and burned to raise the temperature of the working fluid to the desired value. Fuel is burned with a portion of the air supplied in a so-called primary combustion zone. Generally it is desirable to maintain the air-fuel ratio close to the stoichiometric ratio in order to better propagate combustion. The combustion products are then cooled by mixing them with the remaining portion of the air supplied, so-called secondary combustion air. It is desirable that the resulting mixture be of a uniform temperature throughout since the maximum allowable temperature within the mixture is dictated by the permissible operating temperature for the turbine blading.

It is desirable that the fuel-air ratio within the primary combustion zone approach or attain stoichiometric ratio since highest combustion efficiency is achieved when the fuel and air are reacted in stoichiometric proportions. Other advantages also accrue when the fuel-air ratio reaches the stoichiometric value. For example, flame speed is high with a fuel-air mixture near stoichiometric and accordingly the combustion process can be completed in a shorter distance, also burner life is increased since the combustion temperature remains about constant and accordingly thermal fatigue is reduced.

In a conventional gas turbine power plant, such as a turbojet engine the air which is supplied to the primary and secondary combustion zones is the same, i. e. there is substantially no difference in pressure. No attempt is made to supply the air to the primary combustion zone at a greater pressure than that supplied to the secondary combustion zone. In turbojet engine operation it is well known that air inlet conditions affect combustion and combustion efficiency. As the severity of air inlet conditions increases (decreasing absolute pressure and temperature and increasing velocity) combustion efficiency decreases gradually for a large range and then drops very rapidly.

Figures 3, 4:
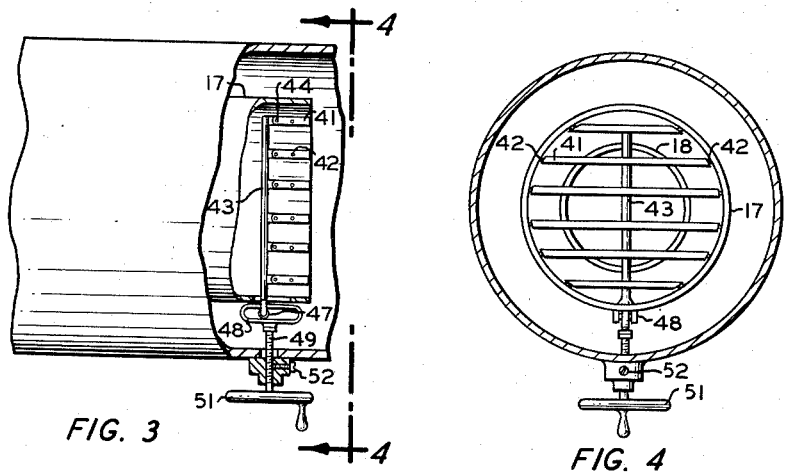

Accordingly it is an object of this invention to provide a means and/or method for controlling combustion conditions in the primary combustion zone. It is another object of this invention to provide an improved combustion apparatus for a gas turbine power plant. It is still another object of this invention to provide a method whereby a turbojet engine can be operated at high efficiency over a larger range of operating conditions. In at least one embodiment of this invention at least one of these or other objects will be achieved. The manner by which these and other objects are achieved will become apparent and suggest itself upon reading the accompanying disclosure and with reference to the accompanying drawings wherein Fig. 1 schematically represents one embodiment of this invention, wherein Fig. 2 schematically represents one means of carrying out an operation of my invention, wherein Figure 3 is a partial elevational view, partly in section, of a burner tube provided with adjustable vanes, wherein Figure 4 is a view taken along line 4—4 of Figure 3, and wherein Figure 5 illustrates diagrammatically a modification of the burner tube of the turbo-jet engine.

In accordance with my invention air is supplied to the combustion zone (primary combustion zone) at about the stoichiometric fuel-air ratio. Still in accordance with my invention the air which is supplied to the combustion zone of a continuous combustion engine such as a gas turbine is at a greater pressure than the air which is supplied to the quenching zone. By thus controlling conditions in the burner tube or primary combustion zone combustion can be obtained over a wide operating range of the engine, such as altitude, engine speed and flight speed, with conditions of pressure and air flow more nearly ideal from combustion efficiency and stability standpoints. Combustion can be obtained under all conditions at or slightly less than the chemically correct ratio of fuel to air, thus assuring the highest reaction rate and combustion efficiency. Also, by separately supplying air to the primary combustion zone at a higher pressure than the air supplied to the quenching zone, not only is independent control of air flow to the primary combustion zone possible but also control of pressure therein. Furthermore due to the increased combustion chamber pressure combustion stability and efficiency are increased. It is also pointed out that by employing near stoichiometric fuel-air ratio and due to the resulting increased flame speed and assuming that the length of the primary combustion zone or burner tube is the same as that of a primary combustion zone in a conventional gas turbine, the increase in reaction rate permits a wider range of inlet conditions without the subsequent quenching by the secondary air and without combustion instability. In the practice of my invention and especially under severe operating conditions the combustion efficiency can be increased up to about 25% or more. For example a modern combustor operating under conditions equivalent to 34,000 ft. altitude, 8000 engine R. P. M. and 0.6 flight mach number and employing n-heptane as the fuel and at a fuel-air (combined primary and secondary air) ratio of about 0.0165, by maintaining the fuel-air ratios in the primary combustion zone near stoichiometric an increase in combustion efficiency of about 11% is possible under these conditions. This improvement becomes even more significant as the severity of inlet conditions increases such as would be obtained at higher altitudes.

For a better understanding of the invention and as to how these results are accomplished reference is now made to the drawing Fig. 1 wherein a gas turbine power plant such as a turbojet engine is schematically represented as employing one embodiment of my invention.

Air compressor 10, preferably a multistage air compressor, supplies low pressure air via lines 11 and 12 to the quenching zone 14. High pressure air from the compressor is supplied to the burner tube or primary combustion zone 15 via line 16. The burner tube or primary combustion zone comprises an outer shell or tube 17 and an inner, separate, preferably concentric shell or tube 18. The downstream end of the burner tube may be fitted with gas directing or swirling means such as louvers 19. Located on the downstream end of the combustion chamber and in communication with the quenching zone is turbine 20 which can suitably supply power to the air compressor as indicated by mechanical linkage 25. Fuel is supplied to the burner tube via line 21. A bleed line 22 having an automatic flow regulating means such as an automatic valve 24 therein communicates the high pressure air line 16 with low pressure air line 11.

In operation, low pressure air is supplied to the quenching zone and high pressure air is supplied to the burner tube. Fuel is burned within the burner tube which is maintained at a higher pressure than the quenching zone. The burner tube walls are cooled by the low pressure secondary air flowing along the outer shell and by a film of high pressure primary air directed into the annular space between the inner and outer shells of the burner tube. The combustion gases upon leaving the burner tube have imparted to them a swirling or gyratory motion by the louvers or vanes at the end of the zone, thereby promoting a more effective and better mixing of the hot combustion gases with the cold secondary air prior to passing through the turbine. As an added feature of this invention by changing the position of the louvers or vanes on the end of the burner tube the pressure therein can be altered, either increased or decreased. This aspect of the invention can be more clearly understood by referring to Figures 3 and 4 of the drawing. Identical reference numerals have been used in these figures to indicate elements previously described with relation to Figure 1. Vanes 41 are attached to tube 17 by means of pins 42 which are inserted in a recess in the wall of the tube and in the ends of the vanes. The vanes are free to pivot around pins 42 so that the opening between the vanes can be adjusted. Rod 43 is movably attached to each of the inner ends of vanes 41 by means of pins 44. As is seen in Figure 5, the lower end of rod 43 is fork-shaped and has a roller 47 positioned therein which rides in elongated guide member 48. The lower side of guide member 48 is attached to screw member 49 which extends through the outer casing of the motor. Screw member 49 is rotatably attached to guide member 48, for example, by means of a ball joint connection, so that the screw member can be turned so as to raise and lower the guide member but without causing rotation of the guide member. A crank 51 is attached to the outer end of the screw member 49 while a set screw 52 is provided for locking the screw member in position. Rotation of crank 51 causes the screw member 49 to be raised and lowered with the result that guide member 48 attached thereto is also raised or lowered. Movement of the guide member causes rod 43 also to move, thereby changing the position of vanes 41.

Furthermore as another added feature of this invention the air compressor will have sufficient output of high pressure primary air to always supply the air in a stoichiometric ratio with the fuel under all operating conditions. Accordingly when the fuel-air ratio within the burner tube falls below the stoichiometric ratio high pressure primary air is bled from the primary air supply line to the secondary air supply line via an automatic flow control valve which is operated by means of a signal, preferably electrical, which is derived by appropriate means from the actual air and fuel flow to the burner tube.

Referring now to the drawing Fig. 2 therein is shown a means and method for supplying air to the burner tube in a stoichiometric amount to the fuel supplied thereto. It is to be understood, however, that the means and method illustrated by Fig. 2 for maintaining a fuel-air stoichiometric ratio is typical and in no sense limitative of my invention. In accordance with my invention the compressor supplying air to the burner tube will always have sufficient output to supply air at the fuel-air stoichiometric ratio under all operating conditions; in other words the variation of the fuel-air ratio of the burner tube will always be toward the lean side (below the fuel-air stoichiometric ratio F/A stoich.) so that air bleed-off will be required to maintain the desired F/A stoich. ratio. Accordingly it is desired to derive an electrical signal proportional to the difference between the actual F/A ratio to the burner tube and the F/A stoich. ratio.

An electrical signal $E_F$ proportional to the mass-fuel flow to the burner tube may be obtained by the usual means which include a venturi meter or like device and a pressure transducer. An electrical signal $E_A$ proportional to the air-mass flow to the burner tube may be obtained by means of the air-mass flow metering circuit which is disclosed in my copending patent application Serial No. 203,993, filed January 2, 1951. These two signals may be divided by means of a servo-actuated bridge circuit similar to that shown for the air-mass flow metering circuit in the above-referred patent application. Thus there is provided an electrical signal $E_{F/A}$ proportional to the fuel-air (F/A) ratio supplied to the burner tube. Alternatively the signal $E_{F/A}$ may be obtained by the means shown in U. S. Patent 2,521,244, which means is similar to the above.

The electrical signal $E_{F/A}$ across conductors 31 and 32 is compared in circuit 33 with an electrical signal $E_{F/A}$ stoich. (equivalent to a fuel-air flow ratio in stoichiometric proportion) which is generated by a suitable source 34. The value of $E_{F/A}$ stoich. will of course depend upon the type of fuel used, etc. and the various circuit constants, but it can be readily determined for any given circuit. A resultant voltage $E_m$ is equal to $E_{F/A} - E_{F/A}$ stoich. is developed across conductors 35 and 36 and is fed to servocontroller and power amplifier 38 which supplies power to motor 39, which opens or closes electrically operated valve 24 so as to maintain the fuel-air ratio in the burner tube at the stoichiometric ratio by bleeding off the high pressure primary air into the low pressure secondary air, as shown in Fig. 1, see line 22 and valve 24 thereof. The position of valve 24 is therefore determined by the value of $E_m$. Whenever $E_{F/A}$ equals $E_{F/A}$ stoich., $E_m = 0$ and the valve is closed. However whenever operating conditions change so that the air supplied by the compressor would normally yield a fuel-air ratio (F/A) less than stoichiometric, $E_m$ becomes greater than zero and the bleed valve is opened the required amount to maintain the stoichiometric fuel-air ratio within the primary combustion zone.

It is of course to be realized that my invention is not limited to the arrangement schematically shown and illustrated by Fig. 1. For example the burner tube may be of any suitable design and construction, not necessarily substantially cylindrical, provided it is suitable for use with a gas turbine engine and effective to carry out my invention. Mixing of primary air and secondary air within the burner tube or primary combustion zone wherein combustion is carried out is avoided. Furthermore the total pressure within the burner tube (combined static and kinetic pressures) is greater than that of the quenching zone or mixing zone. A plurality of combustors (burner tubes) may be employed depending upon the size, design and nature of the gas turbine power plant. These combustors may be spaced and arranged in any suitable fashion, such as being equally spaced along the periphery of one or more circles or any other suitable arrangement. The burner tube may comprise a plurality of concentric shells 18 each outer shell being longer than its next inner shell for film cooling of the burner tube walls. This aspect of the invention is illustrated in Figure 5 of the drawing in which identical reference numerals have been employed to designate elements previously described in conjunction with Figure 1.

Gas turbines employing my invention can be operated under varying ambient pressures, either supra-atmospheric, atmospheric (about 14.7 #/sq. in.) or less than atmospheric such as are encountered at high altitudes, about 30,000 ft. or higher. The pressure differential in pounds per sq. in. between the secondary air and the primary air in the practice of my invention will of course vary with engine design, engine requirements and other conditions such as the ambient atmospheric pressure. This pressure differential may vary between 5 to 50 lbs./sq. in. or more or less, for example under one set of conditions the secondary air may be supplied at a pressure of about 50 lbs./sq. in. absolute and the primary air at a pressure of about 70 lbs./sq. in. absolute.

As will be obvious to those skilled in the art upon reading this disclosure other substitutions, modifications and arrangements, other than those set forth and described herein and which do not depart from the spirit or scope of this invention will suggest themselves.

I claim:

1. A method of operating a continuous combustion engine which comprises supplying a high pressure air stream to a primary combustion zone; supplying a low pressure air stream to a quenching zone, the pressure differential between said high pressure and low pressure air streams varying between about 5 and 50 pounds per square inch; flowing any stoichiometric excess of air from said high pressure air stream to said low pressure air stream prior to supplying said streams to said primary combustion zone and quenching zone; burning fuel with said high pressure air stream supplied to said primary combustion zone; and mixing the resulting combustion gases with said low pressure air stream in said quenching zone.

2. An improved combustion apparatus comprising an air compressor; means for recovering a low pressure air stream therefrom and means for recovering a high pressure air stream therefrom; a separate, defined combustion chamber comprising at least one imperforate shell; means for introducing fuel into said combustion chamber; means for supply said pressure air stream to said combustion chamber; a gas mixing chamber encompassing said combustion chamber and communicating with the downstream end of said combustion chamber; means for supplying said low pressure air stream to said gas mixing chamber; and means for flowing any stoichiometric excess of air from said high pressure air stream to said low pressure air stream.

3. An improved combustion apparatus comprising an air compressor; a gas turbine, said gas turbine connected to and driving said air compressor; a separate combustor comprising at least one imperforate shell; means for introducing fuel into said combustor; a high pressure air conduit connecting said compressor and the upstream end of said combustor; gas deflecting means attached to the downstream end of said combustor; a gas mixing chamber communicating with the downstream end of said combustor and with the upstream side of said gas turbine; low pressure air connecting means between said compressor and said mixing chamber; a conduit connecting said high pressure air conduit and said low pressure air connecting means; and flow control means positioned in said conduit.

4. The apparatus of claim 2 wherein said combustion chamber comprises an outer imperforate shell and an inner imperforate shell, said shells being spaced apart to define an annular space therebetween.

5. The apparatus of claim 3 wherein said combustor comprises an outer imperforate shell and an inner imperforate shell, said shells being spaced apart to define an annular space therebetween.

6. The apparatus of claim 4 wherein means are provided for introducing high pressure air into the annular space formed between said outer and inner shells.

7. The apparatus of claim 3 wherein means are provided for introducing high pressure air into the annular space formed between said outer and inner shells.

8. The apparatus of claim 3 wherein means are provided for altering the pressure within said combustor.

References Cited in the file of this patent

UNITED STATES PATENTS

| | | |
|---|---|---|
| 1,733,792 | Good | Oct. 29, 1929 |
| 2,011,420 | Samuelson | Aug. 13, 1935 |
| 2,193,114 | Seippel | Mar. 12, 1940 |
| 2,253,809 | Pfenninger | Aug. 26, 1941 |
| 2,404,395 | Milliken | July 23, 1946 |
| 2,470,184 | Pfenninger | Mar. 17, 1949 |
| 2,489,683 | Stalker | Nov. 29, 1949 |
| 2,651,175 | Griffith | Sept. 8, 1953 |
| 2,655,787 | Brown | Oct. 20, 1953 |

FOREIGN PATENTS

| | | |
|---|---|---|
| 212,269 | Switzerland | Feb. 17, 1941 |
| 416,030 | Great Britain | Sept. 3, 1934 |
| 484,289 | Great Britain | May 3, 1938 |
| 616,622 | Great Britain | Jan. 25, 1949 |
| 618,644 | Great Britain | Feb. 24, 1949 |
| 963,645 | France | Jan. 4, 1950 |